United States Patent
Laitinen et al.

(10) Patent No.: US 12,507,639 B2
(45) Date of Patent: Dec. 30, 2025

(54) INTELLIGENT BOOM CONTROL WITH END EFFECTOR LEVELING FOR A FELLER BUNCHER

(71) Applicant: Deere & Company, Moline, IL (US)

(72) Inventors: Simo Laitinen, Tampere (FI); Mikko Palmroth, Tampere (FI)

(73) Assignee: DEERE & COMPANY, Moline, IL (US)

( * ) Notice: Subject to any disclaimer, the term of this patent is extended or adjusted under 35 U.S.C. 154(b) by 54 days.

(21) Appl. No.: 18/782,304

(22) Filed: Jul. 24, 2024

(65) Prior Publication Data

US 2025/0048977 A1 Feb. 13, 2025

Related U.S. Application Data

(60) Provisional application No. 63/518,169, filed on Aug. 8, 2023.

(51) Int. Cl.
*A01G 23/081* (2006.01)
*A01B 63/10* (2006.01)
*A01B 69/00* (2006.01)

(52) U.S. Cl.
CPC ........ *A01G 23/081* (2013.01); *A01B 63/1006* (2013.01); *A01B 69/004* (2013.01)

(58) Field of Classification Search
None
See application file for complete search history.

(56) References Cited

U.S. PATENT DOCUMENTS

| | | | |
|---|---|---|---|
| 5,768,810 A * | 6/1998 | Ahn | E02F 3/436 |
| | | | 701/50 |
| 7,753,382 B2 | 7/2010 | Choi | |
| 8,180,532 B2 | 5/2012 | O+3 Halloran et al. | |
| 8,205,164 B2 | 6/2012 | Kim et al. | |
| 8,340,875 B1 * | 12/2012 | Shatters | F15B 21/087 |
| | | | 701/50 |
| 8,437,925 B2 | 5/2013 | Kim et al. | |
| 8,689,939 B2 | 4/2014 | Kim et al. | |
| 8,886,415 B2 * | 11/2014 | Shatters | E02F 3/436 |
| | | | 414/815 |

(Continued)

FOREIGN PATENT DOCUMENTS

| | | | | |
|---|---|---|---|---|
| CN | 113338371 A * | 9/2021 | | E02F 3/437 |
| JP | S6286235 A * | 4/1987 | | |

(Continued)

*Primary Examiner* — Shelley Chen (57) ABSTRACT

An end effector leveling system for moving an end effector of a work machine with a boom assembly, a plurality of sensors, an input interface, and a controller. The plurality of sensors are configured to sense a current movement speed of the hoist boom, the stick boom, and the end effector. The input interface is configured to receive an end effector target angle input command for movement of the end effector at a constant target angle. The controller receives command signals from the input interface, determines based on the command signals a target tilt actuator velocity for actuating the tilt actuator, and an actual tilt actuator tilt velocity actuator and command the tilt actuator to move such that the end effector moves with an aggregate velocity derived from a weighting function of the target tilt actuator velocity and the actual tilt actuator velocity.

12 Claims, 7 Drawing Sheets

(56) References Cited

U.S. PATENT DOCUMENTS

| | | |
|---|---|---|
| 9,738,321 B2 | 8/2017 | Hukkanen |
| 10,480,541 B2 * | 11/2019 | Bellows .................. F15B 13/06 |
| 12,077,933 B2 * | 9/2024 | Nakano ................ E02F 9/2282 |
| 2012/0321425 A1 * | 12/2012 | Shatters ................ F15B 21/087 |
| | | 414/815 |
| 2012/0323451 A1 * | 12/2012 | Shatters ............... F15B 21/087 |
| | | 701/50 |
| 2016/0295814 A1 * | 10/2016 | Raszga ................ A01G 23/003 |
| 2018/0110190 A1 * | 4/2018 | Mahrenholz ......... A01G 23/081 |
| 2022/0170234 A1 * | 6/2022 | Nakano ................ E02F 9/2041 |
| 2025/0129565 A1 * | 4/2025 | Wu ....................... E02F 9/2203 |
| 2025/0163683 A1 * | 5/2025 | Sai ......................... E02F 9/265 |

FOREIGN PATENT DOCUMENTS

| | | | | |
|---|---|---|---|---|
| JP | 2598221 B2 * | 4/1997 | ............. | E02F 3/435 |
| JP | 2002167794 A * | 6/2002 | | |

\* cited by examiner

INTELLIGENT BOOM CONTROL WITH END EFFECTOR LEVELING FOR A FELLER BUNCHER

RELATED APPLICATION

This document (including the drawings) claims priority and the benefit of the filing date based on U.S. provisional application No. 63/518,169, filed Aug. 8, 2023, and entitled INTELLIGENT BOOM CONTROL WITH END EFFECTOR LEVELING FOR A FELLER BUNCHER under 35 U.S.C. § 119 (e), where the provisional application is hereby incorporated by reference herein.

TECHNICAL FIELD

The present disclosure relates relates to intelligent boom control with end effector leveling for a feller buncher.

BACKGROUND

An end effector is a tool, assembly, or other platform that is typically mounted to an extended boom or assembly in order to execute tasks at a distance from the frame of a work vehicle. In some configurations, an end effector can be mounted to a boom assembly extending away from a work vehicle frame, such that movement of the end effector can be moved via controlled movement of the boom.

In the forestry industry, for example, wheeled or tracked feller bunchers are used to harvest standing trees and transport cut trees. In known arrangements, a felling head with one or more saw discs may be mounted to a boom assembly of a feller buncher that includes multiple pivoting booms. Actuators may then be arranged on the boom assembly to pivot the booms relative to each other and thereby move the felling head.

When multiple booms are arranged in a boom assembly, controlled movement of an end effector may be relatively difficult, requiring significant investment in operator training. Under conventional control systems, for example, an operator may move a joystick along one axis to move actuators that pivot a first boom and move the joystick along another axis to move actuators that pivot a second boom. In theory, an operator may control the two booms such that the aggregate movement of all the actuators causes a desired movement of the end effector. However, the changing geometry of the two booms as they move relative to each other, and the work machine introduces significant complexity to the relationships between actuator movement and movement of the end effector. Accordingly, precise control of the end effector may be relatively difficult without significant skill and practice. In this light, a control system for improved control of end effector movement is needed.

SUMMARY

According to an aspect of the present disclosure, a control system for moving an end effector for a work machine includes a boom assembly with a hoist boom, a stick boom, and an end effector. The hoist boom is pivotally coupled to the machine frame and movable relative to the machine frame by a hoist actuator. The stick boom is pivotally coupled to the hoist boom and movable relative to the hoist boom by a stick actuator. The end effector is pivotally coupled to the stick boom at a stick pin and movable relative to the stick boom by a tilt actuator. The plurality of sensor are configured to sense one or more indicators of a current movement speed of the hoist boom, a current movement speed of the stick boom, and a current movement speed of the end effector. The input interface is configured to receive an end effector target angle input command from an operator for movement of the end effector at a constant target angle. The controller is configured to receive, via the input interface, command signals corresponding to at least one of the hoist actuator velocity and the stick actuator velocity for a desired movement of the end effector. The desired movement comprises the end effector moving at the constant target angle relative to one of a machine reference frame and a ground reference frame. The controller is further configured to determine based upon the end effector target angle input command, a target tilt actuator velocity for actuating the tilt actuator, and determine based upon the sensed indicators, an actual tilt actuator velocity for actuating the tilt actuator. The controller is further configured to command the tilt actuator to move such that the end effector moves with an aggregate velocity derived from a weighting function of the target tilt actuator velocity and the actual tilt actuator velocity, wherein the aggregate velocity corresponds to the desired movement.

The desired movement of the end effector comprises a zero-tilt velocity movement relative to the machine reference frame in a horizontal and a vertical movement direction. The tilt velocity input command from an operator during operation updates the aggregate velocity. The target tilt actuator velocity is weighted more than the actual tilt actuator velocity for the aggregate velocity when the boom actuator and the stick actuator exceed a threshold acceleration. The weighted ratio of the target tilt actuator velocity and the actual tilt actual velocity is approximately 65:35. The target tilt actuator velocity is weighted less than the actual tilt actual velocity for the aggregate velocity when the boom actuator and the stick actuator exceed a threshold deceleration. The weighted ratio of the target tilt actuator velocity and the actual tilt actuator velocity is approximately 35:65 in this scenario. The target tilt actuator velocity and the actual tilt actuator velocity for the aggregate velocity are weighted substantially equal when the boom actuator and the stick actuator move at a steady state. A weighted ratio of the target tilt actuator velocity and the actual tilt actuator velocity is approximately 65:35 when the boom actuator and the stick actuator change movement directionally.

The hoist actuator, the stick actuator and the tilt actuator may be configured as linear actuators. The sensed indicators of the current movement speed comprises of a first sensor to detect a current hoist linear actuator length, and a second sensor to detect a current stick linear actuator length. The controller receives a length signal from the first sensor and the second sensor; and filters the length signals for attenuations when the end effector is not engaged with a surface or an object to determine the actual tilt actuator velocity. The controller deactivates filtering the length signal when the length signals correspond to a proximity to one of a full extension or a minimum strick of the tilt actuator and the maximum stroke of the tilt actuator. The target tilt actuator position and the angle of the end effector automatically updates based on a work cycle phase.

A method of controlling fluid flow in a work machine includes the following steps. In a first step, the method includes moving a hoist valve into a first hoist valve position in which the hoist valve is configured to permit flow of hydraulic fluid between a reservoir and a hoist actuator; or moving the hoist valve into a second hoist valve position in which the hoist valve is configured to inhibit flow of hydraulic fluid between the reservoir an the and the hoist actuator. In a next step, the method includes moving a stick valve into a first stick valve position in which the stick valve is configured to permit flow of hydraulic fluid between the reservoir and a stick actuator; or moving the stick valve into a second stick valve position in which the stick valve is configured to inhibit flow of hydraulic fluid between the reservoir and the stick actuator. The method then includes moving an end effector valve into a first end effector position in which the end effector valve is configured to permit flow of hydraulic fluid between the reservoir and the end effector or moving an end effector valve into a second end effector position in which the end effector valve is configured to inhibit flow of hydraulic fluid between the reservoir and the end effector. The method also includes moving a connecting valve into a first connecting valve position in which the connecting valve is configured to permit flow of hydraulic fluid between the hoist actuator and the stick actuator; or moving The method also includes moving the connective valve into a second connecting valve position in which the connecting valve is configured to inhibit flow of hydraulic fluid between the hoist actuator and the stick actuator. The method further includes sensing a position of the hoist boom with a hoist boom position sensor; sensing a position of the stick boom with a stick boom position sensor; sensing a position of the end effector with an end effector sensor; and receiving from an input interface, an end effector target angle input command. The method includes receiving, with the controller, command signals corresponding to at least one of the hoist actuator velocity and the stick actuator velocity input command for a desired movement of the end effector, wherein the desired movement comprises the end effector moving at a constant angle relative to one of a machine reference frame and a ground reference frame. The method also includes determining, based upon the end effector target angle input command, a target tilt actuator velocity for actuating the tilt actuator. The method then comprises determining, based upon the sensed positions, an actual tilt actuator velocity for actuating the tilt actuator. Finally, the method comprises commanding the end effector valve to enable the flow of hydraulic fluid such that the end effector moves with an aggregate velocity derived from a weighting function of the target tilt actuator velocity and the actual tilt actuator velocity, the aggregate velocity corresponding to the desired movement.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The following describes one or more example implementations of the disclosed system 100 for control of end effector 105 movement, as shown in the accompanying figures of the drawings described briefly above. Generally, the disclosed control system 100 (and work vehicles on which they are implemented) allow for improved operator control of the movement of an end effector 105, as compared to conventional systems.

Generally, a controller 52 (or multiple controllers) may be provided, for control of various aspects of the operation of the feller buncher 20, in general). The controller 52 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 52 may be configured to execute various computational and control functionality with respect to the feller buncher 20 (or other machinery). In some embodiments, the controller 52 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 52 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

Figure 1:
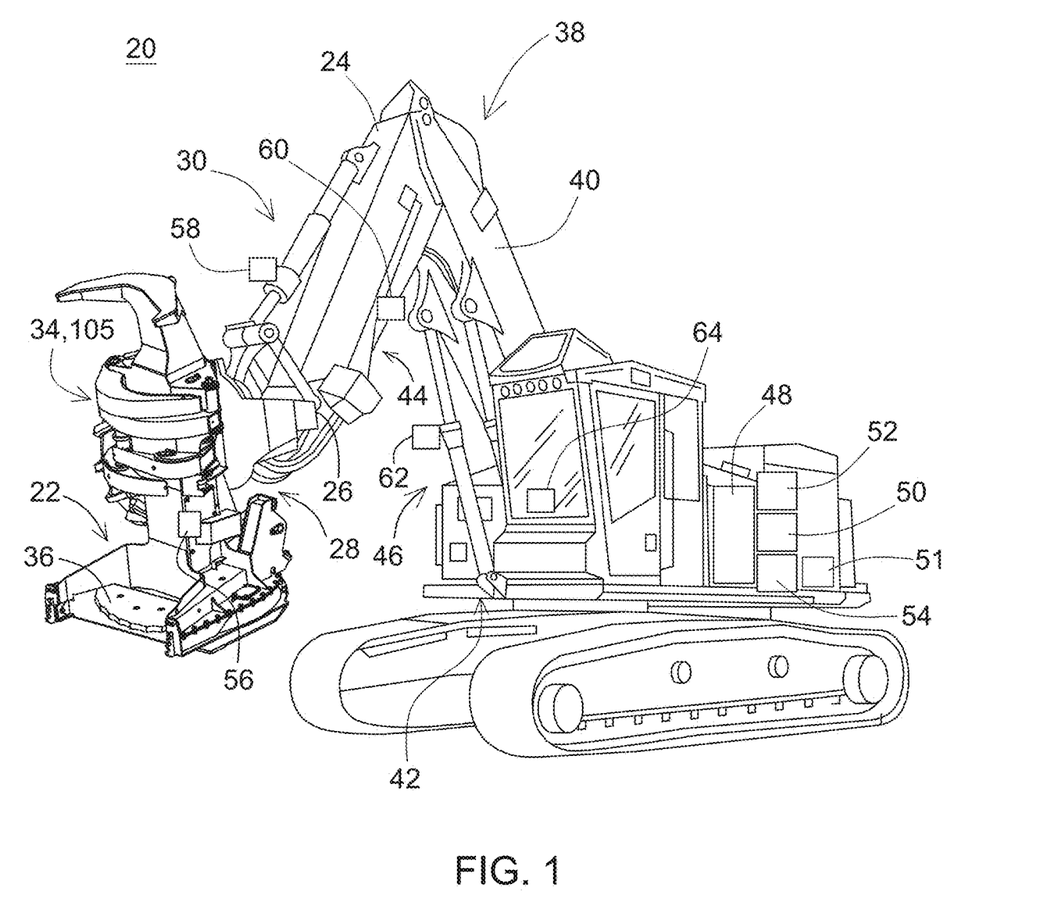
FIG. 1 is a perspective view of an example work machine with a boom-mounted end effector, in the form of a tracked feller bunchers having a felling head mounted to a boom assembly.
Figure 2:
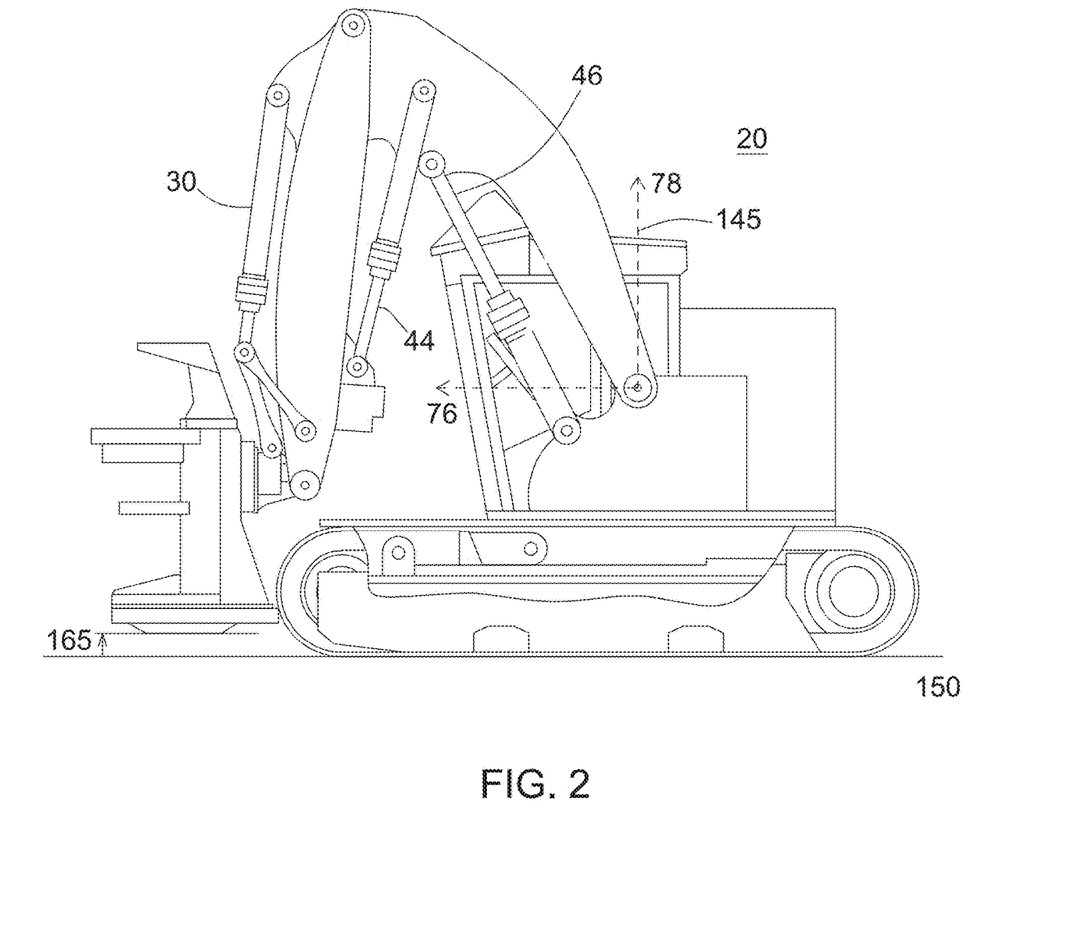
FIG. 2 is a side schematic view of the feller buncher of FIG. 1.
Figure 3:
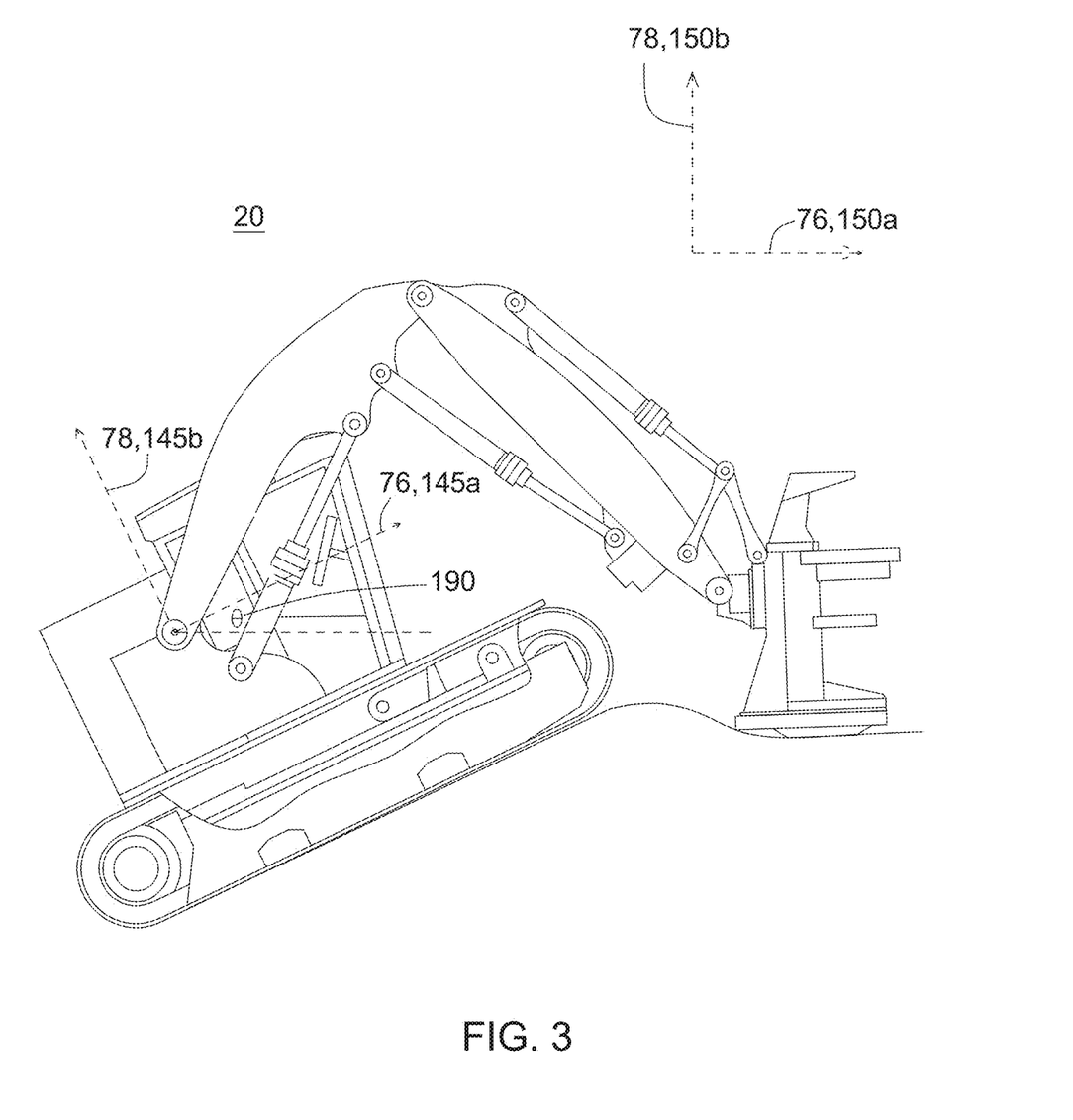
FIG. 3 is a side schematic view of the feller buncher indicating a work machine reference frame.

Now turning to FIGS. 1 through 3, an end effector 105 may be supported with respect to a work vehicle (or other work machine) by a boom assembly 38 and the boom assembly may be moved by various actuators in order to accomplish tasks with the end effector 105. Discussion herein may sometimes focus on the example application of moving an end effector 105 configured as a felling head 22 for a feller buncher 20, with actuators for moving the felling head 22 generally configured as hydraulic actuators. In other applications, other configurations are also possible. In some embodiments, for example, sprayers, claws, grapples, or other devices may also be configured as movable end effectors. Likewise, work vehicles in some embodiments may be configured as excavators or other diggers, as forwarders, as skidders, as concrete crushers or similar machines such as sprayers, or in various other ways.

The disclosed end effector leveling system 100 may be used to receive command signals 110 for movement of an end effector 105 specifying a desired velocity of the end effector 105 relative to a reference frame 115. The system 100 may then determine velocity commands 120 for various actuators such that the commanded movement of the actuators provides the commanded movement of the end effector 105. In this way, operator input along a limited number of degrees of freedom may be converted to commands for relatively complex movement of multiple actuators, in order to provide the desired movement of the end effector 105. This may generally permit intuitive operator input, in that an operator may directly indicate a desired movement (e.g., velocity) for the end effector 105, relative to a reference frame, rather than attempting to provide distinct actuator commands that would result in a desired movement of the end effector 105. As such, an operator may cause relatively precise movement of the end effector 105, without a detailed appreciation of a movement envelope 125 of the end effector 105 or a mapping of end effector position within the envelope to input device movement.

Generally, a boom assembly 38 may include at least two booms that are separately controllable by distinct actuators. For example, a first boom 40 (i.e. hoist boom) of a boom assembly 38 may be attached to a frame 42 of the work vehicle, and may be moved (e.g., pivoted) relative to the frame 42 by a first actuator 46 (i.e. hoist hydraulic actuator). A second boom 24 (i.e. stick boom) of the boom assembly 38 may be coupled to the first boom 40, and may be moved (e.g., pivoted) relative to the first boom 40 by a second actuator 44 (i.e. stick hydraulic actuator). The end effector 105 may be attached to the second boom 24 and, in some embodiments, may be moved (e.g., pivoted) relative to the second boom 24 by a third actuator 30. In this way, distinct movements of the first 46, second 44, and third actuators 30 may correspond to distinct movements of the first boom 40, second boom 24, and end effector 105, respectively. Further, due to the configuration of the boom assembly 38, a movement of the first boom 40 may cause a corresponding movement of the second boom 24 and the end effector 105 relative to the vehicle frame 42, and a movement of the second boom 24 may cause a corresponding movement of the end effector 105 relative to the first boom 40.

In one embodiment, for example, a felling head 22 may be mounted to the machine frame 42 via the boom assembly 38. The hoist boom 40 may be pivotally attached to a frame 42 of the feller buncher 20. The hoist boom 40 may be generally pivoted with respect to the vehicle frame 42 by an actuator (herein, a "hoist actuator"), such as a hydraulic actuator (herein, a "hoist actuator"). The stick boom 24 may be pivotally attached to the hoist boom 40 at a distance from the attachment of the hoist boom 40 to the frame 42, such that the movement of the hoist boom 40 relative to the vehicle frame 42 also moves the stick boom 24. The stick boom 24 may be generally pivoted with respect to the hoist boom 40 by an actuator (herein, a "stick actuator") such as a hydraulic actuator (herein, a "stick actuator"). The felling head 22 may be pivotally attached to the stick boom 24 with a wrist assembly 28, at a distance from the attachment of the stick boom to the hoist boom. The felling head 22 may be pivoted with respect to the stick boom 24 (e.g., about a stick pin of the wrist assembly 28) by an actuator (herein, at "tilt actuator") such as a hydraulic actuator (herein, a "tilt actuator").

The end effector leveling system 100 for moving an end effector 105 for a work machine includes a boom assembly 38 with a hoist boom 40, a stick boom 24, and an end effector 105. The hoist boom 40 is pivotally coupled to the machine frame 42 and movable relative to the machine frame 42 by a hoist actuator 46. The stick boom 24 is pivotally coupled to the hoist boom 40 and movable relative to the hoist boom 40 by a stick actuator 44. The end effector 105 is pivotally coupled to the stick boom 24 at a stick pin 26 and movable relative to the stick boom 24 by a tilt actuator 30. A plurality of sensors 56 are configured to sense one or more indicators of a current movement speed 130 of the hoist boom 40, a current movement speed 135 of the stick boom 24, and a current movement speed 140 of the end effector 105.

The input interface 64 may be provided to receive velocity input commands 120 (i.e., inputs representing vectors of velocity magnitude and direction) for movement of the end effector 105. In this regard, for example, velocity input commands 120 may be distinguished from commands directly specifying a target position. An input interface 64 may be configured in various ways, including as an interface with multiple input devices such as joysticks, switches, knobs, levers, wheels, and so on.

Various sensors may also be provided. In some embodiments, various sensors 54 (e.g., pressure, flow or other sensors) may be disposed near the pumps 48 and valves 50, or elsewhere on the feller buncher 20). In some embodiments, various sensors may be disposed near the felling head 22. For example, sensors 56 may be disposed on or near the felling head 22 in order to measure parameters including the rotational speed of the saw disc 36, hydraulic pressure for driving the saw disc 36 (e.g., via a hydraulic motor (not shown)), proximity of objects to the felling head 22, and so on. In some embodiments, sensors (e.g., linear position sensors 58, 60 and 62) may be configured to determine the length of the actuators 30, 44, and 46, respectively, or detect various other indicators of the current orientation of the stick boom 24, hoist boom 40, and felling head 22. Other sensors may also (or alternatively) be used. For example, angular position or displacement sensors may be utilized in place of the linear position sensors 58, 60 and 62, in order to detect the angular orientation of the felling head 22, stick boom 24, and hoist boom 40, relative to each other or relative to the vehicle frame 42. In such a case, the detected angular orientations may provide alternative (or additional) indicators of the current position of the stick boom 24, the hoist boom 40, and the felling head 22. Similarly, in some embodiments, the sensors 58, 60, and 62 or similar other sensors may alternatively (or additionally) be configured to detect the velocity of movement of the actuators 30, 44, and 46, respectively.

Now turning to FIGS. 1 through 5, the controller 52 is configured to receive, via the input interface 64, a command signal 110 corresponding to at least one of the hoist actuator velocity 46a and the stick actuator velocity 44a input command 120 for a desired movement of the end effector 105. The desired movement comprises the end effector 105 moving at a constant angle 190 relative to one of a machine reference frame (145a, 145b) and a ground reference frame (150a, 150b). The controller 52 is further configured to determine, based upon the velocity input commands 120, a target tilt actuator velocity 155 for actuating the tilt actuator 30, and determine based on upon the sensed indicators 68, an actual tilt actuator velocity 157 for actuating the tilt actuator 30. The controller 52 is further configured to command the tilt actuator 30 to move such that the end effector 105 moves with an aggregate velocity 159 derived from a weighting function 160 of the target tilt actuator velocity 155 and the actual tilt actuator velocity 157, wherein the aggregate velocity 159 corresponds to the desired movement. In an alternative embodiment, the end effector target angle input command 193 from an operator can update the aggregate velocity 159 during operation. However, basing the target tilt actuator velocity 155 solely on the actual tilt actuator velocity 157 can result in the tilt actuator velocity to lag in movement if derived from only a measured hoist actuator velocity 130 and the stick actuator velocity 135. The disclosed system addresses this deficiency. Another variable associated with actual tilt actuator velocity 157 inefficiencies is that any disturbances in measuring the hoist and stick actuator velocities (130, 135) from bounciness may get transferred to the target tilt actual velocities 155. These jerky movement may amplify hoist and stick actuator bounciness, thereby creating a negative feedback loop. Therefore, the disclosed system 100 combines the target tilt actuator velocity 155 and the actual tilt actuator velocity 157 using weighting functions to define how much each component is used in different situations for a more accurate predictive tilt actuator velocity 159 and angle. Relations presented in the description below give indications of weighting differences but may not represent the exact ratio but is substantially close.

The desired movement of the end effector 105 may further comprise of a zero-tilt velocity movement 165 relative to the machine reference frame 145 or the ground reference frame 150 in a horizontal 76 and a vertical 78 movement direction.

Figure 4:
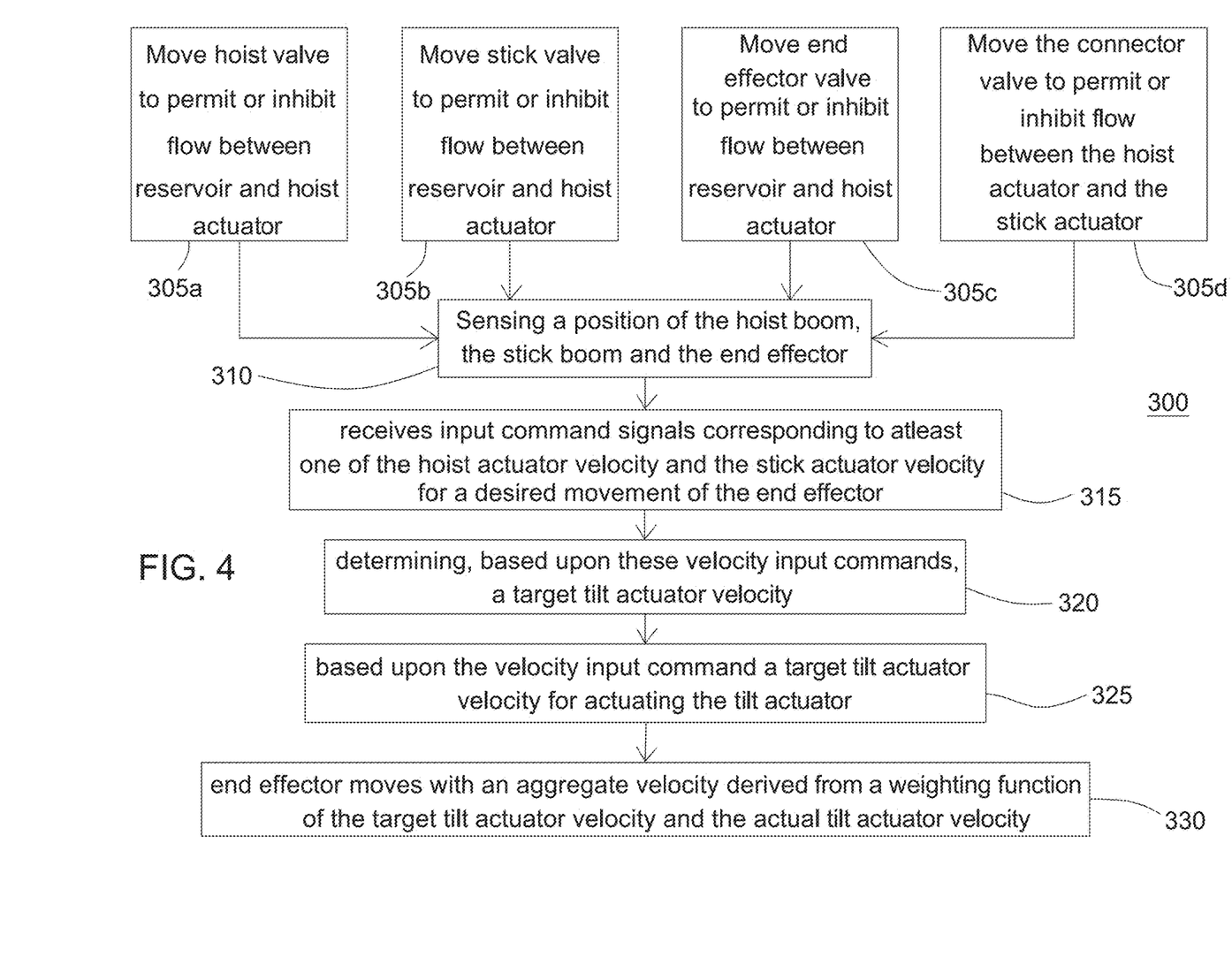
FIG. 4 is a graphical representation of a control scheme for commanding the tilt actuator for moving the end effector with a weighting function and position control.
Figure 5:
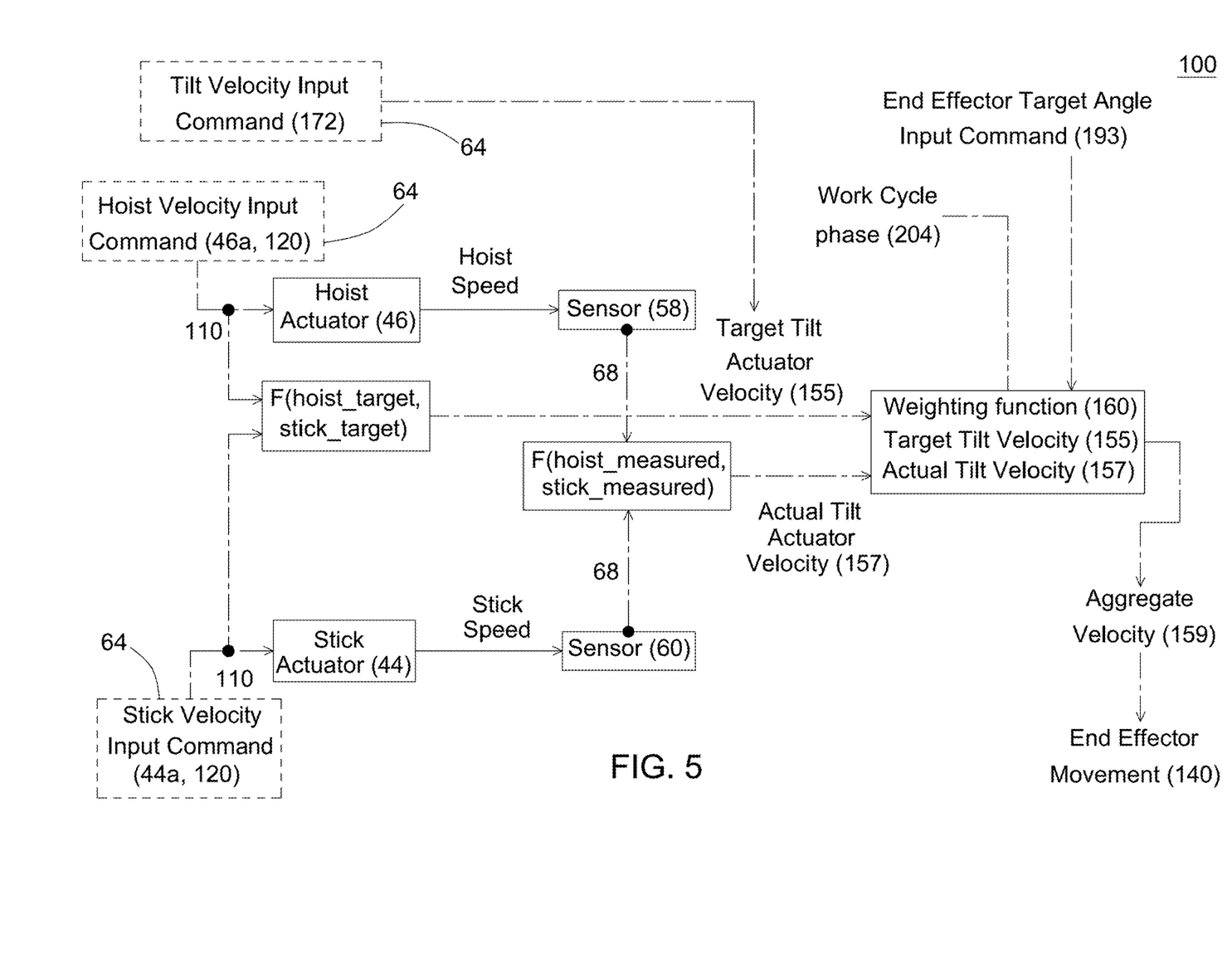
FIG. 5 is a graphical representation of a control scheme for moving the end effector with weighting functions based on operational conditions.

The target tilt actuator velocity 155 is weighted more than the actual tilt actuator velocity 157 for the aggregate velocity 159 when the hoist actuator 46 and the stick actuator 44 exceed a threshold acceleration 175. In this scenario, the weighted ratio 180 of the target tilt actuator velocity 155 and the actual tilt actual velocity 157 is approximately 65:35. During heavy accelerations the target tilt actuator velocity 155 is weighted more heavily to avoid delays in tilt.

The target tilt actuator velocity 155 is weighted less than the actual tilt actual velocity 157 for the aggregate velocity 159 when the boom actuator 46 and the stick actuator 44 exceed a threshold deceleration 185. In this scenario the weighted ratio 180 of the target tilt actuator velocity 155 and the actual tilt actuator velocity 157 is approximately 35:65. During heavy decelerations the actual tilt actuator velocity 157 is weighted more heavily to prevent overly aggressive tilt decelerations and achieve balance. Inertial forces of may prevent the hoist actuator velocity 46a and stick actuator velocity 44a to decelerate as quickly as the tilt actuator.

The target tilt actuator velocity 155 and the actual tilt actuator velocity 157 velocity for the aggregate velocity 159 are weighted substantially equal when the boom actuator 46 and the stick actuator 44 move at a steady state 177. Finally, a weighted ratio 180 of the target tilt actuator velocity 155 and the actual tilt actuator velocity 157 is approximately 65:35 when the boom actuator 46 and the stick actuator 44 change movement directionally (i.e. first a deceleration followed by an acceleration).

Figure 6:
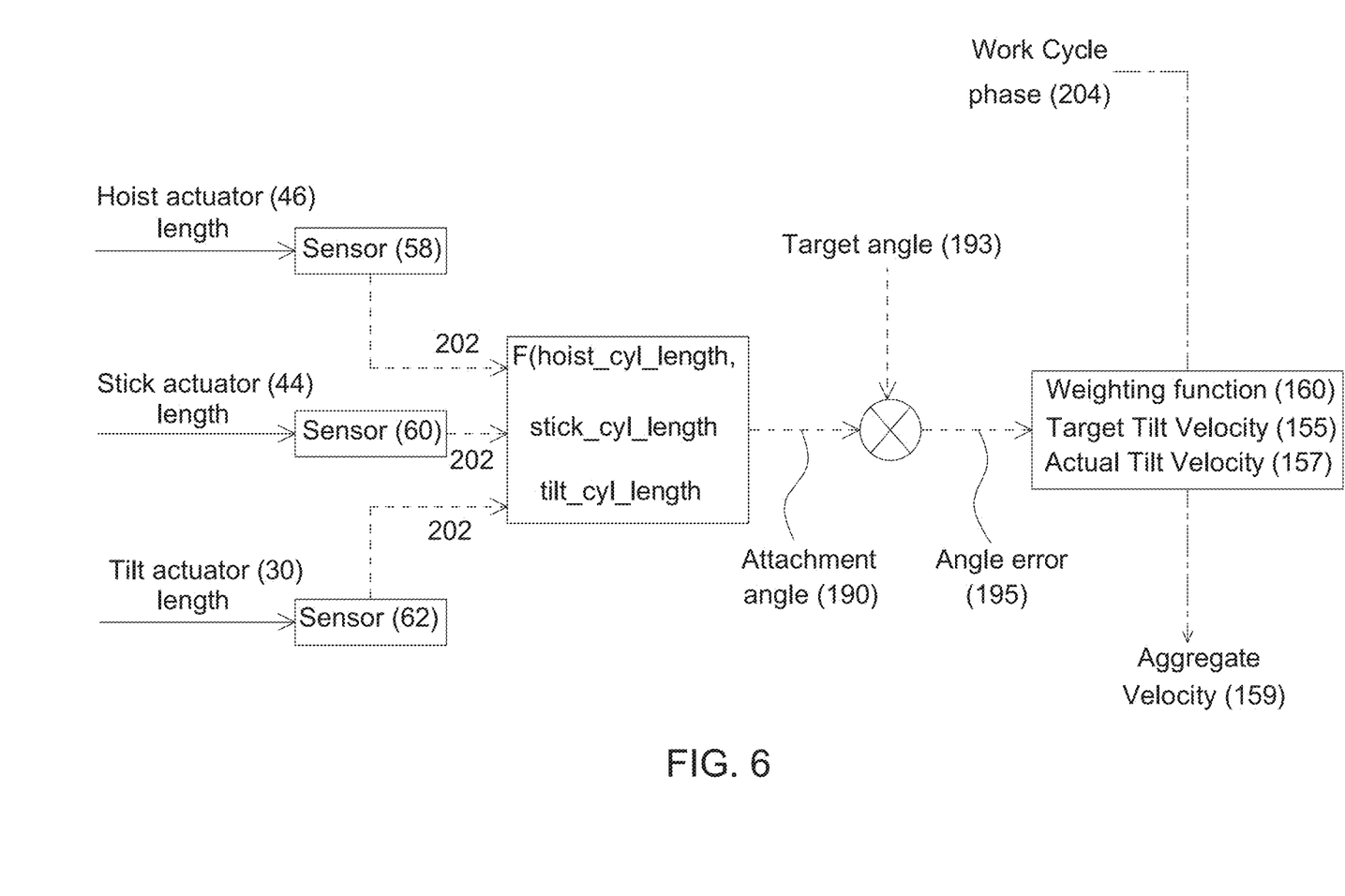
FIG. 6 is a graphical representation of a control scheme for moving the end effector with filtering functions using position control.

The quality of the actual tilt actuator velocity 157 signal may further be improved by implementing an adaptive low-pass filter. Filtering parameters are defined based on hoist actuator velocity 46a and stick actuator velocity 44a velocity changes. When the hoist actuator velocity 46a and the stick actuator velocity 44a velocity is accelerated or decelerated and the sensed indicators of speed 68 or actual tilt actuator velocity 157 are also about to change, the actual tilt actuator velocity 157 is not filtered. If there is no change in the hoist actuator velocity 46a and the stick actuator velocity 44a velocity then the sensed indicators 68 of speed and actual tilt actuator velocity 157 should remain relatively constant. All significant changes in the sensed indicators 68 of speed are considered as disturbance (bounciness) and actual tilt actuator velocity 157 is heavily filtered to attenuate disturbance. In case of feller buncher hoist and stick actuator speeds can drop when saw blade hits big tree. Saw blade rotation speed can be used to identify tree contact and decide if filtering should be deactivated even though hoist actuator velocity 46a and stick actuator velocities 44a are not changing.

The stick actuator 44 and the tilt actuator 30 may be configured as linear actuators. In the embodiment shown in FIG. 6, the sensed indicators 68 of the current movement speed comprises of a first sensor 58 to detect a current hoist linear actuator length, and a second sensor 60 to detect a current stick linear actuator length. The controller 52 receives a length signal 202 from the first sensor 58 and the second sensor 60; and filters the length signals 202 for attenuations when the end effector 105 is not engaged with a surface or an object to determine the actual tilt actuator velocity 157. The controller 52 deactivates filtering the length signal 202 when the length signals 202 correspond to a proximity to one of a full extension or a minimum stick of the tilt actuator and the maximum stroke of the tilt actuator.

The target tilt actuator position and the angle 190 of the end effector 105 automatically update based on a work cycle phase 204. In application, the operator sets tilt angle (also referred to as the end effector target angle) often in middle of a work cycle when tilt actuator is moving and therefore tilt velocity input command 172 or measured speed cannot be used to trigger update the end effector movement. A possible cross axis interference in joystick signal considered (tilt axis easily deviates from zero position if up/down axis used). The end effector target angle 193 is changed or offset added automatically based on work cycle phase 204. For example, the attachment may be tilted back automatically after cut for better tree control. Additionally, there may be a predefined dump angle for the tilt angle. The set tilt angle 193 may further follow an accumulator cycle.

The feller buncher 20, may include one or more pumps 48, which may be driven by an engine of the feller buncher 20 (not shown). Flow from the pumps 48 may be routed through various valves 50 and various conduits (e.g., flexible hoses) in order to move one or more of the actuators 30, 44, and 46. Flow from the pumps 48 may also power rotation of the saw disc 36, or various other components of the feller buncher 20. The flow from the pumps 48 may be controlled in various ways (e.g., through control of the various valves 50), in order to cause movement of the actuators 30, 44 and 46 with different velocities. In this way, for example, a target velocity for a particular actuator may be implemented by various velocity output commands to the pumps 48, valves 50, and so on.

Figure 7:
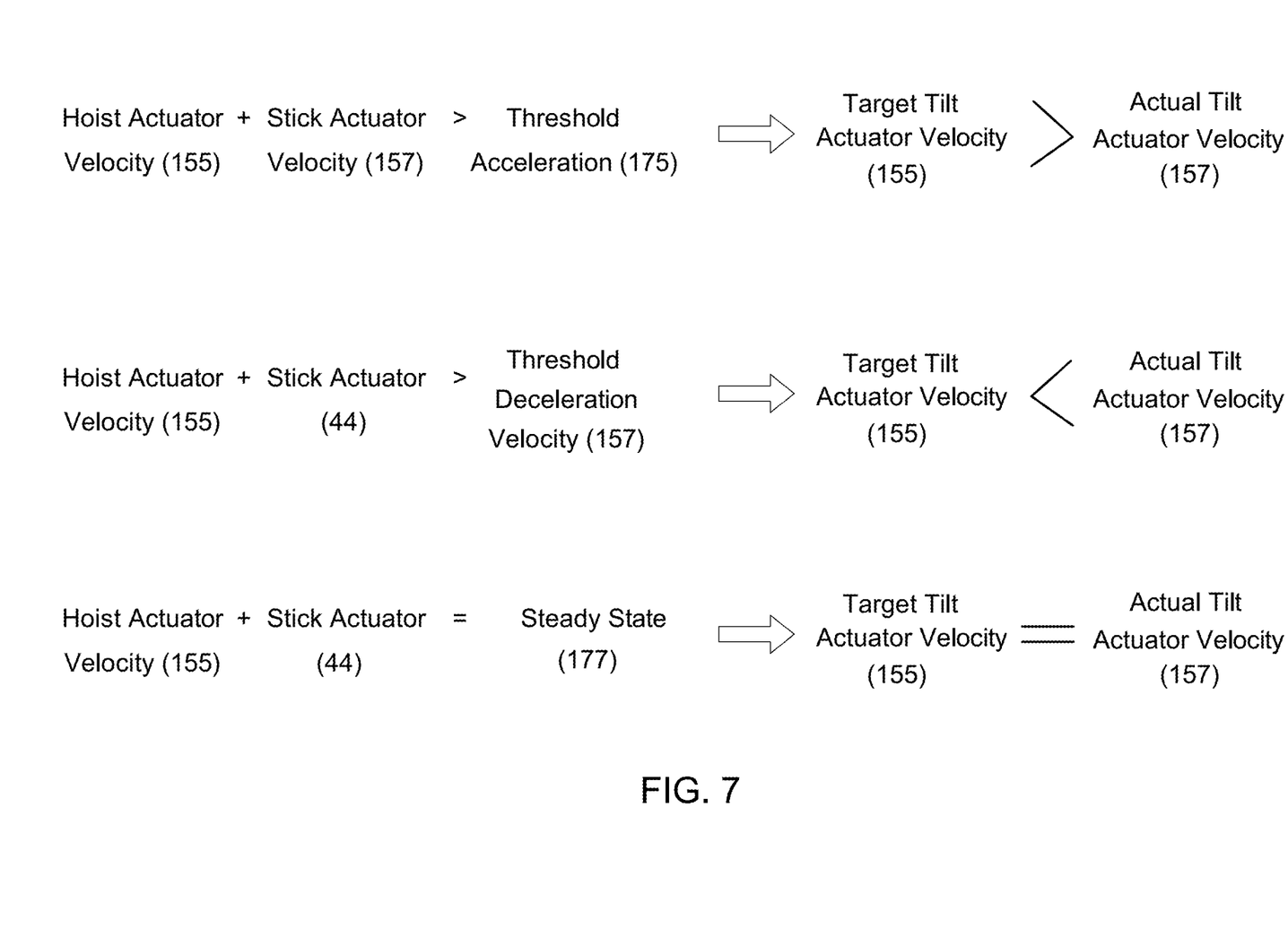
FIG. 7 is a graphical representation of the weighting functions as applied to FIG. 5 and FIG. 6.

Now turning to FIG. 7, a method 300 of controlling fluid flow in a work machine includes the following steps. In a step 305a, the method includes moving a hoist valve 50a into a first position in which the hoist valve 50a is configured to permit flow of hydraulic fluid between a reservoir 51 and a hoist actuator 46 or moving the hoist valve 50a into a second position in which the hoist valve 50a is configured to inhibit flow of hydraulic fluid between the reservoir 51 and the hoist actuator 46. In a next step 305b, the method includes moving a stick valve 50b into a first position in which the stick valve 50b is configured to permit flow of hydraulic fluid between the reservoir 51 and a stick actuator 44 or moving the stick valve 50b into a second position in which the stick valve 50b is configured to inhibit flow of hydraulic fluid between the reservoir and the stick actuator 44. Then in step 305c, the method includes moving an end effector valve 50c into a first position in which the end effector valve 50c is configured to permit flow of hydraulic fluid between the reservoir 51 and the tilt actuator 30 or moving an end effector valve 50c into a second position in which the end effector valve 50c is configured to inhibit flow of hydraulic fluid between the reservoir 51 and the tilt actuator 30. In step 305d, the method 300 also includes moving a connecting valve 50d into a first position in which the connecting valve 50d is configured to permit flow of hydraulic fluid between the hoist actuator 46 and the stick actuator 44 or moving the connective valve 50d into a second position in which the connecting valve 50d is configured to inhibit flow of hydraulic fluid between the hoist actuator 46 and the stick actuator 44. In step 310, the method 300 includes sensing a position of the hoist boom with a hoist boom position sensor; sensing a position of the stick boom with a stick boom position sensor; and sensing a position of the end effector with an end effector sensor. In step 315, the controller receives command signals 120 corresponding to at least one of the hoist actuator velocity 46a and the stick actuator velocity 44a for a desired movement of the end effector 105, wherein the desired movement comprises the end effector 105 moving at a constant angle 190 relative to one of a machine reference frame 145 and a ground reference frame 150. In step 320, the method 300 also includes determining, based upon these velocity input commands 120, a target tilt actuator velocity 155 for actuating the tilt actuator 30. In step 325, the method 300 then comprises determining, based upon the velocity input command 120, a target tilt actuator velocity 155 for actuating the tilt actuator 30. Finally in step 330, the method comprises commanding the hoist valve 50a, and the stick valve 50b to enable the flow of hydraulic fluid such that the end effector 105 moves with an aggregate velocity 159 derived from a weighting function 160 of the target tilt actuator velocity 155 and the actual tilt actuator velocity 157, the aggregate velocity 159 corresponding to the desired movement.

In some embodiments, the boom assembly 38 may be configured such that the hoist boom 40, the stick boom 24 and the felling head 22 are pivoted by the various actuators along a common plane. Other actuators may then be configured to collectively move the entire boom assembly 38 (e.g., by rotating the vehicle frame) to change the orientation of the common plane of movement for the boom assembly 38. Still other actuators may be configured to actuate the boom assembly 38, or other components, in other ways. For example, a particular actuator may be configured to rotate the felling head 22 such that a cutting plane of a disc saw 36 of the felling head 22 is pivoted with respect to the common plane of movement for the boom assembly 38.

Intelligent boom control (hereinafter referred to as "IBC") calculates target velocities for boom actuators (hoist 46 and stick 44). IBC calculates target tilt actuator velocity 155 that keeps felling head angle 190 constant when hoist and stick actuators (46, 44) move according to their target velocities (46a, 44a).

When the felling head control is implemented to IBC system, the target tilt actuator velocity 155 for the tilt actuator 30 is calculated simultaneously. The purpose of this form of intelligent boom control when applied to feller bunchers where the end effector 105 is the felling head, leveling the end effector 105 is to keep the felling head angle 190 (relative to machine frame 145 or a ground reference frame 150) constant during boom operation. The felling head angle 190 is controlled or otherwise adjusted with the tilt actuator 30 which is advantageous for felling buncher operations. An adaptive filter can be implemented to angle error 195 calculation. That is, the hoist and stick actuator positions can be filtered before and angle error 195 is calculated to attenuate signal fluctuations.

Additionally, the IBC felling head leveling includes a position controller, a subsystem of the controller, to improve control accuracy. The position controller uses proportional control with changing gain. The target angle 193 is calculated using hoist (46), stick (44) and tilt (30) actuator lengths along with boom geometry. Position control is challenging because of variables such as a long boom, heavy loads, high speeds and flexible hydraulic system may cause fluctuation in actuator movements, wherein the amplitudes of fluctuation may be relatively high relative to the required accuracy of leveling system. It is contemplated that the position controller gain must be set quite low to avoid jerky controller performance which makes boom movements bouncier. The position controller may further be deactivated after boom joysticks have not been used for 1-3 seconds. Additionally, the position controller may also be deactivated close to minimum and maximum strokes of tilt actuator because end cushioning and stroke limits make system nonlinear and discontinuous.

Position controller must have target position (angle) and there are multiple ways how felling head target angle can be set. This includes setting the target angle 193 by the operator during boom operation.

Updating a target angle 193 when an operator is manually positioning attachment to desired angle. The target tilt angle update is stopped with certain delay after tilt joystick signal drops to zero. A delay is needed to consider actual delay in tilt actuator movements.

Actual hoist and stick velocities (46a, 44a) may change in degree of precision based on the position of extension or retraction of the actuator, and relevant when calculating a target tilt actuator velocity 155. Some variable delays (hydraulic valve response time and acceleration) impacting actuator movements can occur because of the complexities of hydraulic systems. The disclosed control system advantageously addresses any errors 195 associated with hoist and stick actuator velocities (46a, 44a) by addressing these to improve accuracy. These non-idealities, wherein an actual tilt actuator velocity speed 157 can be calculated. The actual tilt actuator velocity speed 157 is based on a measured speed of the hoist 46 and stick 44 actuators where in aggregate represents the actual tilt speed that would keep felling head angle 190 constant.

The operator may further control the tilt actuator manually by directly controlling the end effector target angle input command 193 with joystick when felling head leveling is activated. Tilt velocity input command 172 is added to velocity controller and position controller output. The system advantageously prioritizes manual control or the direct or raw velocity input command in specific scenarios. For example, after a fell cut operation, the operator must have good control on felling head angle to balance the weight of the tree correctly. When the operator moves the boom tip up speed controller tries to tilt felling head forward to maintain a leveled position. If operator simultaneously tilts the attachment backwards then the speed controller and manual control act on opposite directions. Therefore, the manual control must be slightly prioritized to ensure good response on operator's command.

Furthermore, operators often want maximum tilt actuator velocity when dumping tree(s) from felling head or setting head back to vertical position after trees are set on ground.

The manual control must be prioritized, and maximum actuator speed enabled even if tilt leveling tries to move actuator to opposite direction.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An end effector leveling system for moving an end effector of a work machine, the work machine including a boom assembly with a hoist boom pivotally coupled to a machine frame and movable relative to the machine frame by a hoist actuator, a stick boom pivotally coupled to the hoist boom and movable relative to the hoist boom by a stick actuator, and the end effector pivotally coupled to the stick boom at a stick pin and movable relative to the stick boom by a tilt actuator, the control system comprising:
   a plurality of sensors configured to sense one or more indicators of a current movement speed of the hoist boom, a current movement speed of the stick boom, and a current movement speed of the end effector;
   an input interface configured to receive an end effector target angle input command from an operator for movement of the end effector at a constant target angle; and
   a controller configured to:
      receive, via the input interface, command signals corresponding to at least one of the hoist actuator velocity and the stick actuator velocity for a desired movement of the end effector, wherein the desired movement comprises the end effector moving at the constant target angle relative to one of a machine reference frame and a ground reference frame;
      determine based upon the end effector target angle input command, a target tilt actuator velocity for actuating the tilt actuator;
      determine based upon the sensed indicators, an actual tilt actuator velocity for actuating the tilt actuator; and
      command the tilt actuator to move such that the end effector moves with an aggregate velocity derived from a weighting function of the target tilt actuator velocity and the actual tilt actuator velocity, the aggregate velocity corresponding to the desired movement.

2. The system of claim 1, wherein the desired movement of the end effector comprises a zero-tilt velocity movement relative to the machine reference frame in a horizontal and a vertical movement direction.

3. The system of claim 1, wherein a tilt velocity input command from an operator during operation updates the aggregate velocity.

4. The system of claim 1, wherein the target tilt actuator velocity is weighted more than the actual tilt actuator velocity for the aggregate velocity when the boom actuator and the stick actuator exceed a threshold acceleration.

5. The system of claim 4, wherein a weighted ratio of the target tilt actuator velocity and the actual tilt actuator velocity is approximately 65:35.

6. The system of claim 1, wherein the target tilt actuator velocity is weighted less than the actual tilt actuator velocity for the aggregate velocity when the boom actuator and the stick actuator exceed a threshold deceleration.

7. The system of claim 6, wherein a weighted ratio of the target tilt actuator velocity and the actual tilt actuator velocity is approximately 35:65.

8. The system of claim 1, wherein the target tilt actuator velocity and the actual tilt actuator velocity for the aggregate velocity are weighted substantially equal when the boom actuator and the stick actuator move at a steady state.

9. The system of claim 1, wherein a weighted ratio of the target tilt actuator velocity and the actual tilt actuator velocity is approximately 65:35 when the boom actuator and the stick actuator change movement directionally.

10. The system of claim 1, wherein the hoist actuator, the stick actuator and the tilt actuator are configured as a linear actuators;

wherein the sensed indicators of the current movement speed comprises of a first sensor to detect a current hoist linear actuator length, and a second sensor to detect a current stick linear actuator length;

wherein the controller receives a length signals from the first sensor and the second sensor; and filters the length signals for attenuations when the end effector is not engaged with a surface or an object to determine the actual tilt actuator velocity.

11. The system of claim 10, wherein the controller deactivates filtering the length signals when the length signals corresponding to a proximity to one of a full extension or a minimum stroke of the tilt actuator and the maximum stroke of the tilt actuator.

12. The system of claim 9, wherein the target tilt actuator position and the angle of the end effector automatically updates based on a work cycle phase.

* * * * *